United States Patent [19]

Lagares-Corominas

[11] Patent Number: 5,537,916
[45] Date of Patent: Jul. 23, 1996

[54] AUTOMATIC MACHINE FOR STERILIZATION AND ASEPTIC PACKING OF PASTEURIZED MEAT PRODUCTS

[75] Inventor: Narciso Lagares-Corominas, Besalu, Spain

[73] Assignee: Metalquimia, S.A., Girona, Spain

[21] Appl. No.: 446,570

[22] Filed: May 19, 1995

[51] Int. Cl.[6] ............................... A23L 3/00; A23L 3/02; A23L 3/10
[52] U.S. Cl. ............................... 99/356; 99/470; 99/472; 99/483
[58] Field of Search ............................ 99/352, 355, 356, 99/451, 483, 484, 416, 534, 535, 467–472; 452/134, 135, 198; 53/425, 450, 510, 512, 517, 127, 79; 426/392, 412, 414; 141/59, 65

[56] References Cited

U.S. PATENT DOCUMENTS

| | | | |
|---|---|---|---|
| Re. 31,153 | 1/1984 | Glen | 99/470 |
| Re. 32,695 | 6/1988 | Nahra et al. | 99/467 |
| 3,603,240 | 9/1971 | McCarthy | 99/356 |
| 3,661,073 | 5/1972 | Schack et al. | 99/533 |
| 3,793,939 | 2/1974 | Wieser et al. | 99/484 |
| 3,809,844 | 5/1974 | Stenstrom | 99/451 |
| 3,874,145 | 4/1975 | Schmidt | 53/510 |
| 4,296,588 | 10/1981 | Vetter | 53/510 |
| 4,885,897 | 12/1989 | Gryouda et al. | 53/432 |
| 4,948,610 | 8/1990 | Goglio | 426/392 |
| 4,968,516 | 11/1990 | Thompson | 99/330 |
| 5,048,404 | 9/1991 | Bushnell et al. | 99/483 |
| 5,269,216 | 12/1993 | Corominas | 99/356 |

*Primary Examiner*—Timothy F. Simone
*Attorney, Agent, or Firm*—Jacobson, Price, Holman & Stern

[57] ABSTRACT

An improved automatic machine for sterilization and aseptic packing of meat products such as a piece of ham, shoulder meat or the like. The machine operates in a continuous cycle and includes first, second and third stations. The first station sterilizes an outer surface of a meat piece which is fed, after pasteurization, in a stripped condition into the first station. The first station has a tightly sealable chamber with a grid deck for supporting and then releasing the meat piece. The first station further includes a mechanism for tightly closing the chamber after introduction of the meat piece; a mechanism for opening the chamber after sterilization, and a heating mechanism for heating the inside of the chamber. The second station achieves packing of the meat piece after sterilization and includes a mechanism for removing the meat piece from the first station and for transferring the meat piece onto the second station. The second station also includes a mechanism for sequentially positioning packings from a magazine up to a position close to the second station and mechanisms for opening each packing and transferring the meat piece into the packings, as well as mechanisms for transferring filled packings to the third station where the packings are vacuum sealed. The improvements comprise an arrangement wherein the mechanism for removing the meat piece from the first station is retained in the chamber during sterilization and wherein the meat piece is transferred from the chamber directly into one of the packings.

14 Claims, 5 Drawing Sheets

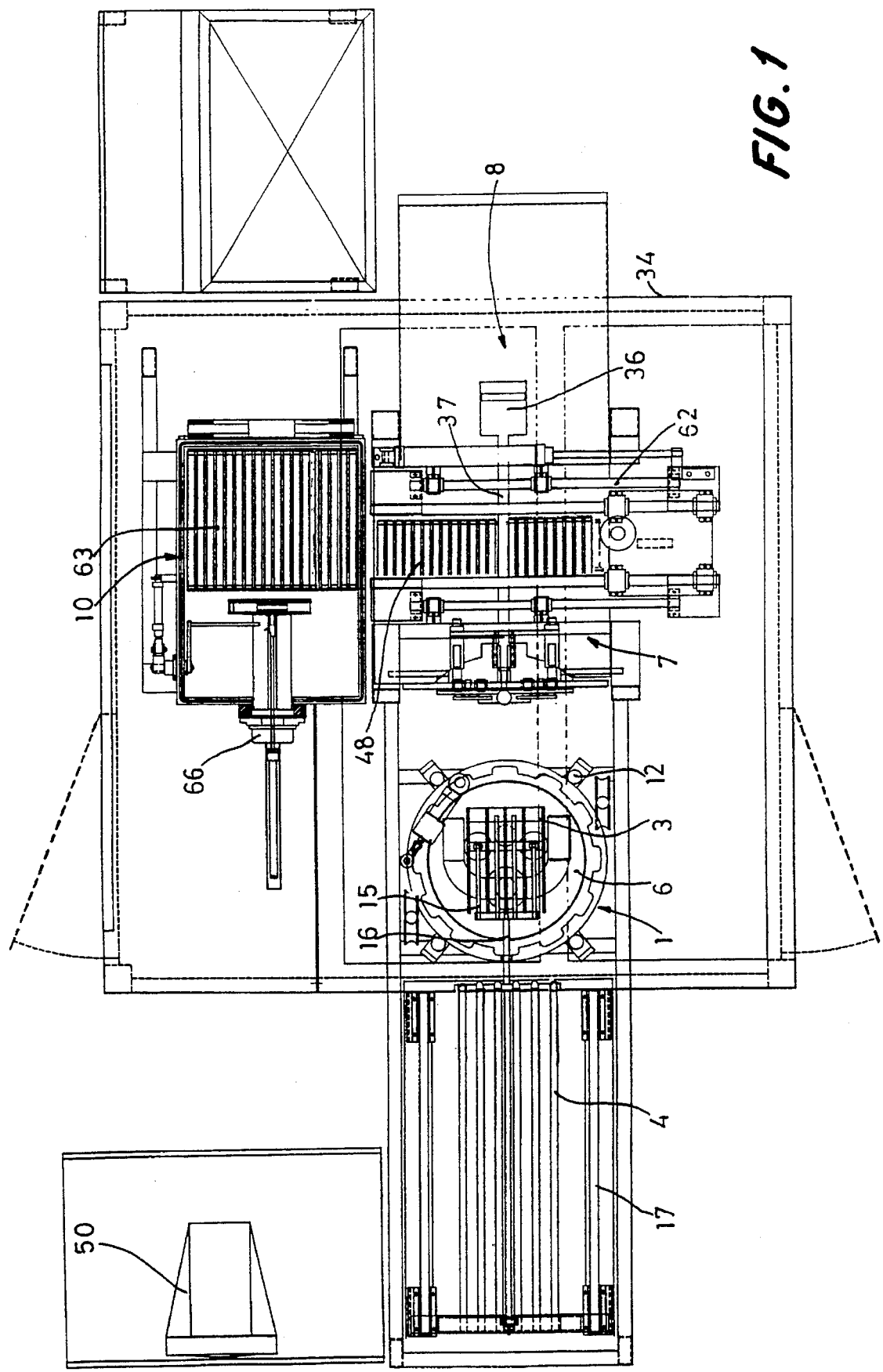

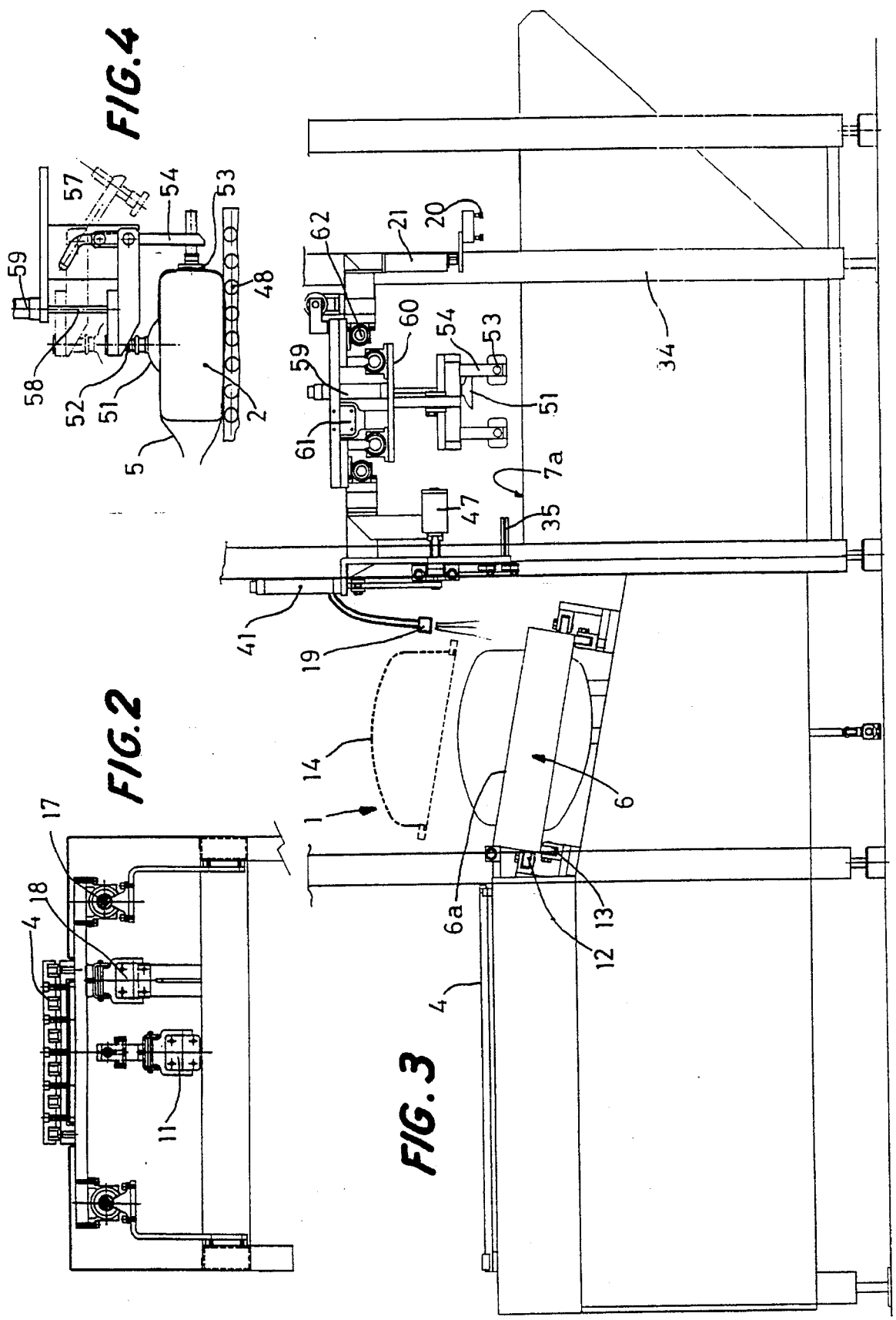

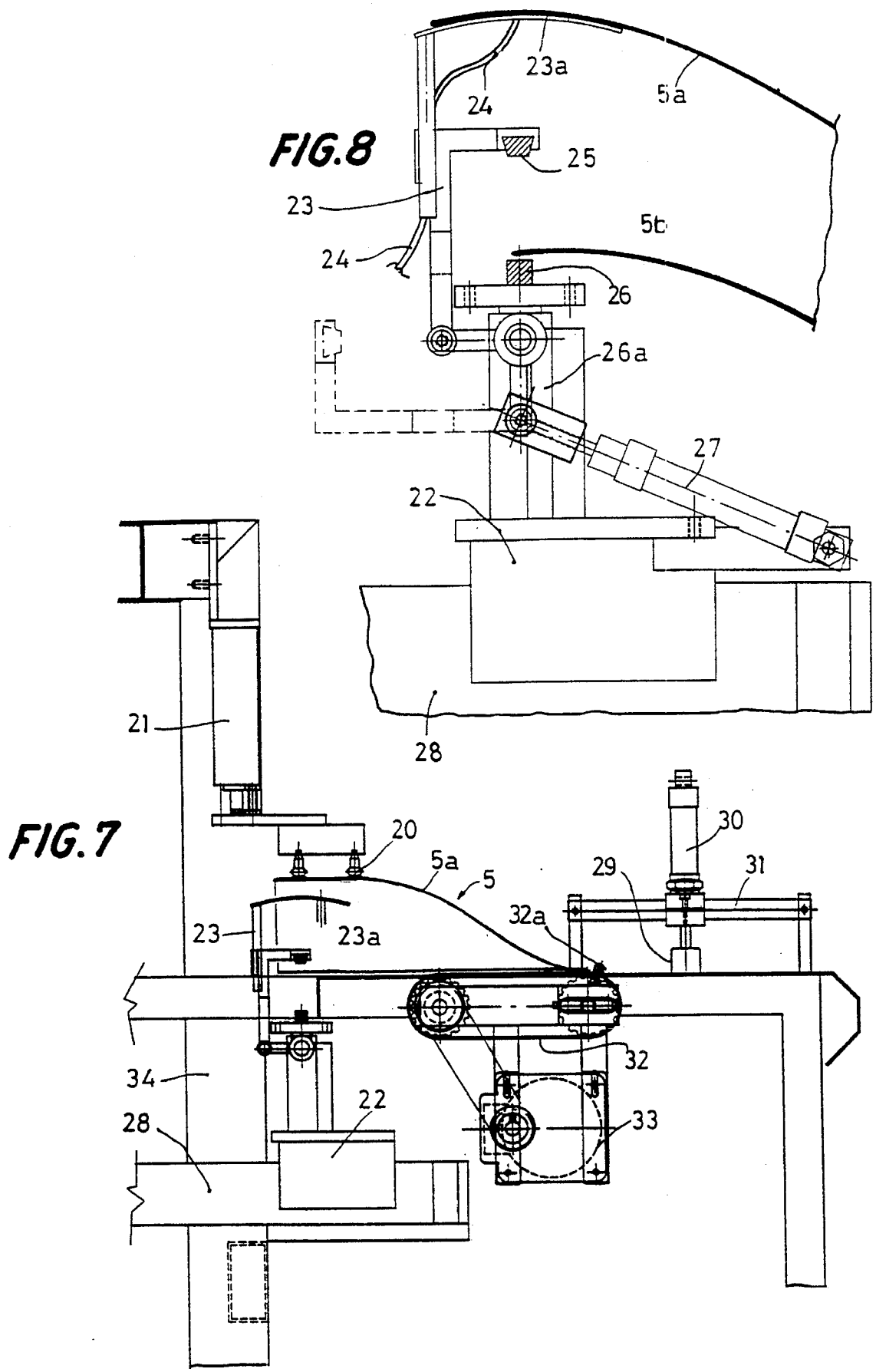

AUTOMATIC MACHINE FOR STERILIZATION AND ASEPTIC PACKING OF PASTEURIZED MEAT PRODUCTS

BACKGROUND OF THE INVENTION

1. Field of the Invention

The present invention relates to in improvements introduced into an automatic machine for sterilization and aseptic packing of pasteurized meat products such as a piece of ham or shoulder meat which have previously sustained deboning, injecting of additives and/or various ingredients, tenderizing, massaging, curing and pasteurizing, said latter stage comprising the boiling of the piece inside a vessel with the interposition of an open or closed protecting or wrapping means till having reached a temperature at the thermal centre of the meat piece of 65° to 75° C. and during a period of time sufficient for a proper pasteurization of the product which guarantees heating effects (F value 10° C.–70° C.) over 30 measured at the thermal centre of the piece, finally removing the pasteurized meat piece from its wrapping means in order to dispose of the exuded fluids and to condition the outer surface of the product or meat piece.

2. Description of the Prior Art

These improvements are more in particular applied to a machine like the one described in U.S. Pat. No. 5,269,216 being herein included by reference, said machine providing a sterilization of the surface layer or stratum of the stripped meat pieces after said treatment and before their final packing, said sterilization being obtained by submitting them to a high temperature thermal shock during a very short time interval as per a HTST technique (High Temperature Short Time) operating under conditions of ambient temperature in direct contact with the surface of the meat piece generally higher than 150° C. and with a treatment time per piece of less than 15 seconds, thereupon proceeding to an immediate repacking of the product under aseptic conditions.

BRIEF SUMMARY OF THE INVENTION

The improvements consist in a substantial redesigning and in a simplification of various members integrating the machine of the said U.S. Pat. No. 5,269,216 mainly with a view to:

guarantee the asepsis of the process at all times, minimizing the maintenance tasks necessary for such a purpose;

shorten the times for the transfer of the meat piece from inside the sterilization chamber to the inside of a packing such as a sack or bag or a packing of another type;

speed up the drying of the meat piece after having opened the sterilization chamber and during the transfer of said piece towards the packing area;

provide a transfer of packings of the tubular bag type up to a meat piece reception position in a regular and positive way, in order to guarantee the continuity and regularity of the operational cycle;

reduce the time of transfer of the packed product up to the sealing station;

dispose of the waste left over when carrying out the final vacuum sealing of the packings;

simplify the discharge of the product from the vacuum sealing station.

The machine of the U.S. Pat. No. 5,269,216 includes a first station for the sterilization of the surface of a meat piece which is fed into said first station after a stage in which the meat piece has been stripped of a wrapper used in a previous pasteurizing stage in order to dispose of the exuded fluids and to condition the outer surface of the product. Said first station comprises: a tightly sealable chamber with means for receiving, supporting in a stable position in its inside and releasing the meat piece introduced in it by a movable supporting floor situated in the proximity of said chamber; means for tightly closing said chamber after having introduced in it the meat piece, and means for opening the chamber after a predetermined time necessary for a sterilization of the surface of the piece; and means for supplying heat to the inside of said chamber while it is tightly sealed, till the ambient inside has reached an average temperature comprised between 100 and 160 degrees, with a treatment time interval of less than 15 seconds. According to the proposed improvements means have been provided for removing the meat product from the inside of said chamber which remain inside said sterilization chamber supporting the product during the thermal shock sterilization stage, and upon the conclusion of said stage transfer it directly to the inside of a packing. The improvements comprise as well means for sequentially grabbing, linearly transferring and positioning said packings with their secured opening completely open and facing said product removing means.

BRIEF DESCRIPTION OF THE DRAWINGS

The above and other advantages and characteristics of the improvements being the object of this invention will be now described referring to an example of a preferred embodiment illustrated by means of the accompanying sheets of drawings. In said drawings:

FIG. 1 is a top plan-view of the machine incorporating the improvements of the invention, said machine being enclosed in its entirety, excepting the feeding conveyor and the control monitor, in an enclosing cabin swept by a vertical laminar flow in order to guarantee the asepsis of the ambient where the working cycles are carried out;

FIG. 2 is a side elevational, vertically sectioned view of the movable supporting floor to enter the meat inside the first station showing also a cylinder to whose rod is attached a grid for the removal of the meat product from the inside of the thermal shock sterilizing chamber;

FIG. 3 is a side elevational view of the machine shown in FIG. 1;

FIG. 4 is a side elevational detailed view of the means for transporting the just bagged product towards the vacuum sealing station;

FIG. 7 is an elevational detail, on a larger scale, of the means for gripping the bag by its leading, partially open part for its linear transfer till the rods of the means represented in FIGS. 5 and 6 can be introduced into its opening;

FIG. 8 shows in an elevational view the means for picking one by one the bags for the final packing of the product from a bag supply area, and for partially opening said bags;

10 shows a tilting roller floor for the discharge of the product.

DETAILED DESCRIPTION

Figure 5:
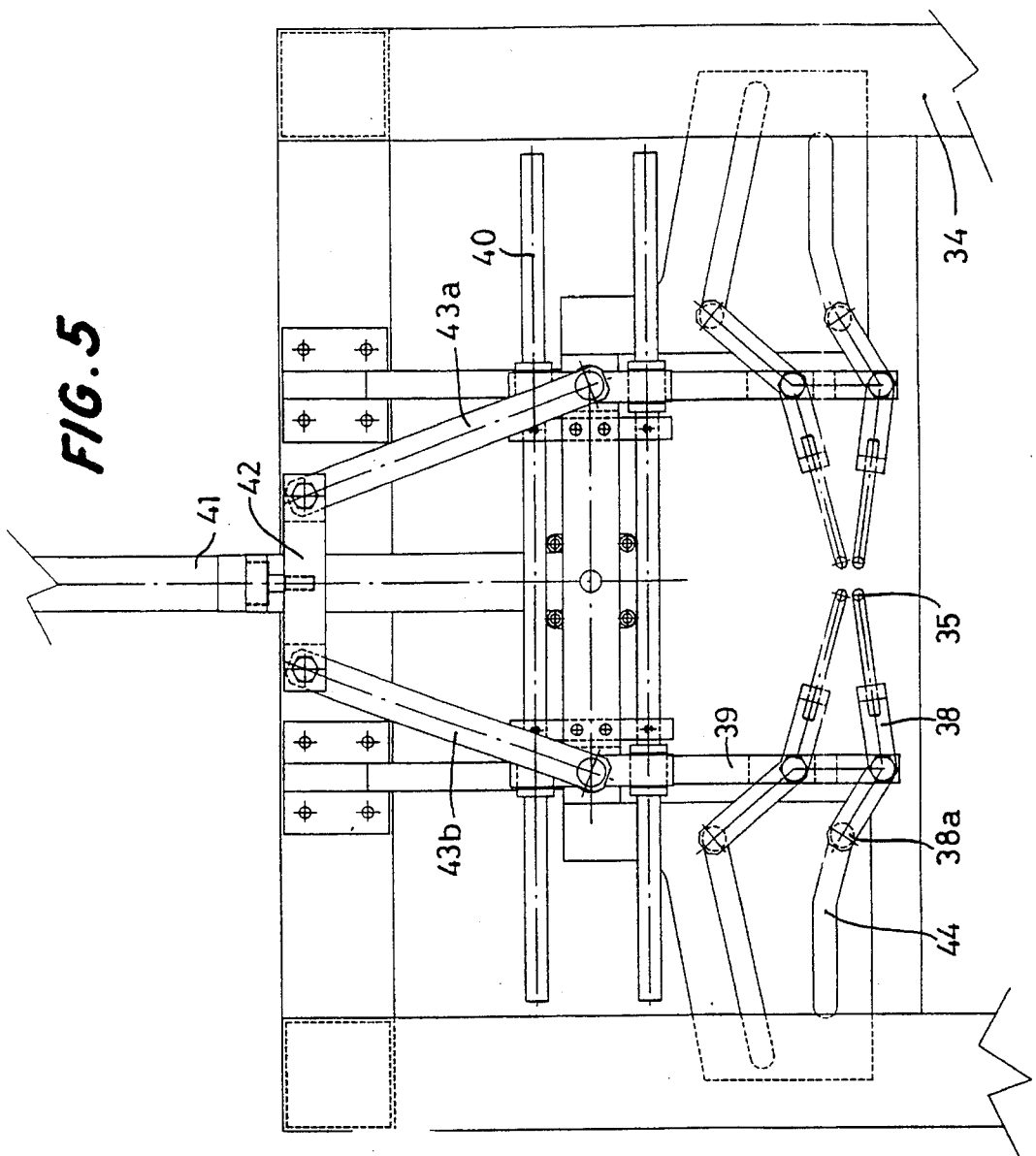
FIGS. 5 and 6 show in respective side and front elevations the means for receiving the slightly open bag for the packing of the product, and for completely opening said bag presenting it in front of said grid for the removal of the meat product.
Figure 6:
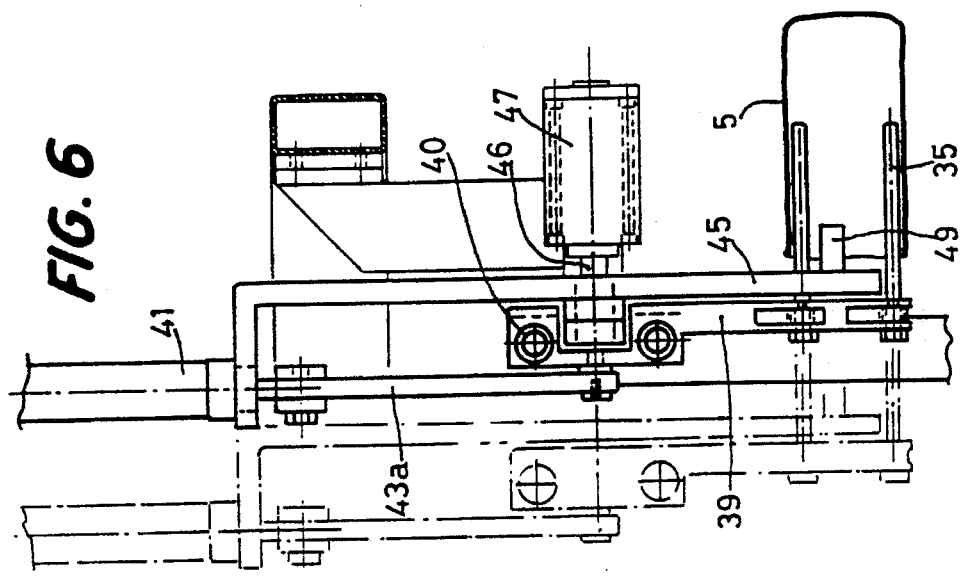
Figure 9:
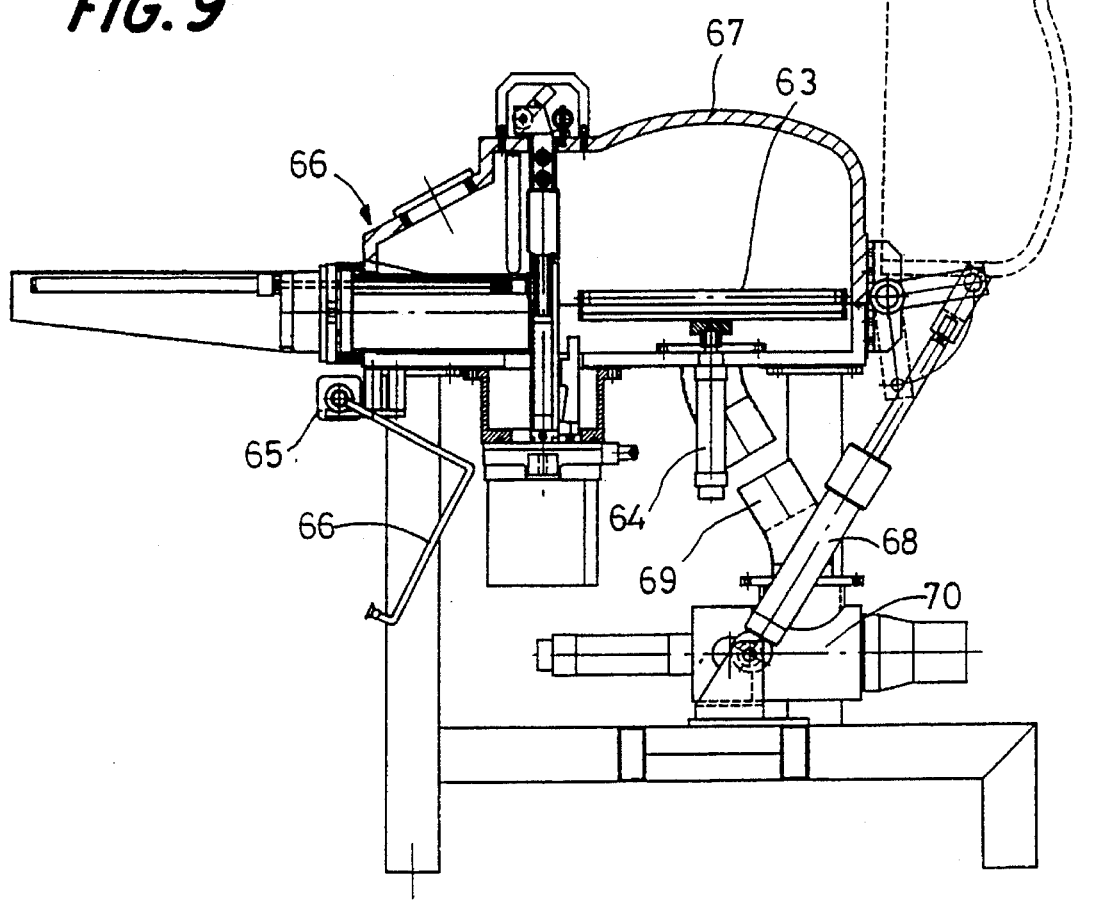
FIG. 9 is an elevational view of the station where the packings filled with the product are vacuum sealed, and FIG.
Figure 10:
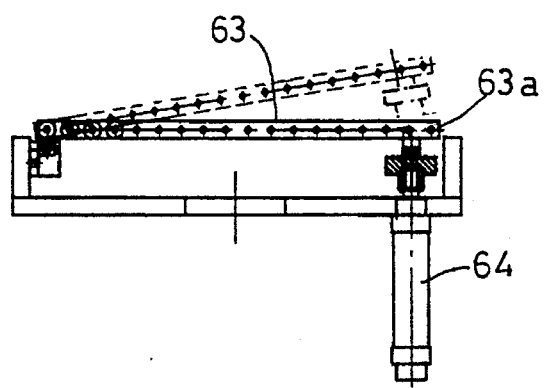

With reference to FIGS. 1 to 9 the improvements of this invention are applicable to an automatic machine for sterilization and aseptic packing of meat products such as a piece of ham, shoulder meat or the like, said machine operating in a continuous cycle and including:

a first station 1 for the sterilization of the surface of a meat piece 2 which is fed in a stripped condition to the inside of said first station 1 after a stage in which said meat piece has been removed from a packing upon the conclusion of a previous pasteurization stage, in order to dispose of the exuded fluids and to condition the outer surface of the product, said first station 1 comprising a tightly sealable chamber 6 with a grid supporting floor 3 associated to a fluid-operated cylinder to receive, support in a stable position and release the meat piece 2 introduced in its inside by a supporting floor 4 acting as a feeder situated in the proximity of said chamber 6; means for tightly closing said chamber 6 once having introduced in it the meat piece, and means for opening said chamber after a predetermined time necessary for a sterilization of the surface of the meat piece; and means for supplying heat to the inside of said chamber 6 while it is tightly sealed, till the ambient inside has reached an average temperature comprised between 100 and 160 degrees, with a treatment time interval of less than 15 seconds;

all as stated in the mentioned U.S. Pat. No. 5,269,216.

According to the present improvements the means for removing the meat piece from the sterilization chamber 6 consist in a floor 15 which supports the meat piece 2 during the thermal shock sterilization stage inside said sterilization chamber, and said floor is associated to said chamber 6 in such a way that they remain in its inside during the thermal shock sterilization stage. Moreover the means for removing the meat piece are shifted with such a travel that they transfer it directly from the inside of said sterilization chamber to the inside of a packing.

To this aim the second station for packing the meat piece after its surface sterilization include means for sequentially positioning the packings 5 to be filled in front of said means for removing the superficially sterilized meat piece, interposing themselves in their direction of travel.

The lateral edge 6a of the thermal shock sterilization chamber 6 is inclined and the mentioned floor for removing the meat piece comprise a support shaped like a fork 15 with multiple parallel arms between which can pass the strips of said 3 deck located inside the chamber 6, said strips leaving the piece on said fork-like support 15 where it remains during the sterilization stage, said fork-like support being attached to the end of a rod 16 of a fluid-operated cylinder 11 operable to shift said support 15 when the cover 14 of the chamber 6 is lifted, and with it the meat piece 2, towards the outside of the chamber, said support 15 and rod 16 thereby passing above that portion of said inclined lateral edge 6a of the sterilization chamber which is situated at the lowest level.

Therefore the travel of said supporting floor 15 for removing the meat piece from the sterilization chamber 6 is rectilinear and substantially parallel to a horizontal plane of the second station 7 on which the packings 5 to be filled are shifted, and takes place at a level situated slightly above said plane 7a of the second station.

In order to provide a drying of the slightly wet surface of the meat piece 2 after its sterilization nozzles 19 have been provided for supplying jets of filtered, pressurized hot air which act on the outer surface of the meat piece 2 after the sterilization stage and the opening of the cover 14 of the chamber 6 and during the time of transfer of the meat piece to the inside of the packing 5 presented in an open condition.

The feeder 4 for introducing the meat piece inside the chamber adopts the configuration of a grid of longitudinal strips and is associated to a fluid-operated cylinder 18 whose rod extends parallelly to mentioned fluid-operated cylinder 11 and at a higher level thereof.

The bag-type packings for the final packing of the meat pieces once sterilized are stored in a magazine 8 connected to each other by removable tapes connecting their lateral parts, and are partially superimposed in such a way that a leading portion of each bag projects beyond the next following one, as per an arrangement known in itself. The means for transferring the bags 5 from said magazine 8 to packing area on the . . . 7a comprise suction pads 20 associated to a fluid-operated cylinder 21 and operable to get in touch with the top sheet 5a of the first bag 5 still connected to the assembly of bags in the magazine 8 and to lift said sheet 5a, and a tilting lever 23 in the shape of an inverted "L" which includes a curved member 23a at its end and can tilt after the actuation of said suction pads 20 to position itself inside the opening of the bag 5 and underneath said top sheet 5a. The curved member 23a, ending said lever 23 has an opening, which is operable to get in contact with the inner face of said sheet 5a when the latter descends upon the member through the actuation of the cylinder 21, there being a tube 24 ending in said opening to apply a vacuum through it in order to grip said top sheet 5a from the inside. The lever integrates a gripper jaw 25 provided to be applied against the edge of the bottom sheet 5b of said bag 5 and to thereupon grip it when closing on said jaw 25 another lower jaw 26 actuated by a fluid-operated cylinder 26a for tightly gripping said edge of the bottom sheet 5b. These elements (lever, lower jaw) are assembled on a block 22 which is associated to a fluid-operated cylinder 28 of longitudinal travel operable to shift said block 22 along the second station thus pulling said first bag and separating it from the rest of the bags stored in the magazine 8 till arranging it in a position where it is presented in a partially open condition in a packing area of said second station 7 and penetrated by four rods 35 situated two at each side of said lever 23, extending parallelly to the direction of said travel and linked to a spreading mechanism. The bottom 7a of said second station 7 has an opening 36 to allow the tilting passage of the lever 23 in order to grab the first free bag 5 of the magazine 8, and a longitudinal opening 37 to facilitate its longitudinal travel up to said packing area.

Mentioned rods 35 are bent at their end that is not introduced into the bag, and are associated to the ends of first kind levers 38 linked on lateral supports 39 mounted in a sliding arrangement on transversal guides 40 so as to be mutually approached or spaced through the actuation of a fluid-operated cylinder 41 vertical travel whose rod is attached to a cross member 42 from which derive in a hinged connection two diverging arms 43a, 43b which are link-coupled with said two lateral supports 39, the opposite end of said levers being linked in a sliding arrangement along guiding slots 44 of vertical plates 45, said slots 44 having lengths which are conveniently inclined so that the shifting of the lateral supports 39 determines when pivoting the levers 38 the mutual spreading of said rods 35 and thereby the full opening of the bag 5 in whose opening the free ends of said rods 35 are introduced.

Associated to the plates 45 there are at both sides thereof photoelectric detectors 49 for detecting a packing 5 with the rods 35 introduced in its opening once having been duly positioned.

The whole assembly of the supports 39 to which are linked in a hinged connection the levers 38 carrying said rods 35 and the plates 45 and cylinder 41 are associated to the rod 46 of a fluid-operated cylinder 47 whose travel is coaligned with the direction in which the packings 5 are shifted, so as to produce once the packing 5 has been filled with the meat piece 2 a shifting motion which takes place in a forward direction combined with a retracting of the rods 35 in order to release the bag 5 filled with the meat piece 2 onto a roller deck 48 of said second station. After the release of the bag and conveyance thereof on said roller 48 the fluid operated cylinder 47 moves in a rearward direction all the mentioned assembly in order to place the rods in a packing position to receive a new empty bag 5 to be filled.

In addition to the free-turning roller deck 48 said second station 7 includes means for transporting the meat piece up to a vacuum sealing 10 third station comprising an assembly consisting of a suction pad 51 which is resiliently loaded by a spring 52 which is applied against the top face of the bag 5 filled with the meat piece 2, and a tilting pusher 53 which is applied against a lateral face of the bag 5 filled with the meat piece, associated to a slide 60 which travels transversally to the direction for positioning the bag 5 to be filled, slides on transversal guides 62 and is actuated by a fluid-operated cylinder 61.

The third vacuum sealing station 10 includes a free-turning roller deck 63 which is coplanar with the roller deck 48 of said second station, tiltable, hinged at one of its lateral sides and linked with its other edge to a fluid-operated cylinder 64 of vertical travel. A rotating actuator 65 has been provided to which a twice bent lever 66 is attached which is operable to pick and remove from the station the bag waste having been left over after having been cut by the vacuum sealing unit which is of a known type.

I claim:

1. In an automatic machine for sterilization and aseptic packing of meat products, said machine operating in a continuous cycle and including:

a first station for sterilizing an outer surface of a meat piece which is fed in a stripped condition to an inside of said first station after a stage in which said meat piece has been removed from a packing upon the conclusion of a previous pasteurization stage, in order to dispose of exuded fluids and to condition the outer surface of the meat piece, said first station having a tightly sealable chamber with a grid deck associated with a fluid-operated cylinder for receiving, supporting in a stable position and releasing the meat piece when introduced into the chamber by a feeder situated in the proximity of said chamber; means for tightly closing said chamber after having introduced the meat piece into said chamber, and means for opening said chamber after a predetermined time necessary for sterilization of the outer surface of the meat piece; and means for supplying heat to an inside of said chamber while said chamber is tightly sealed until an average temperature between 100 and 160 degrees is reached inside said chamber using a treatment time interval of less than 15 seconds;

a second station for packing the meat piece after sterilization, and means for removing the meat piece from said first station and for transferring said meat piece onto said second station which includes: means for sequentially positioning packings from a magazine up to a position close to said second station; means for opening openings of the packing and for holding at least two walls of the packing; means for transferring the meat piece from said second station into the packings while one of the packings' openings is kept open; and means for transferring filled packings, while still open, up to a third station where said packings are then vacuum sealed;

the improvements comprising:

an arrangement wherein the means for removing the meat piece from the first station is located with respect to the tightly sealable chamber so that the means for removing the meat piece from the first station are retained in the tightly sealable chamber during sterilization of said meat piece;

said means for removing the meat piece being arranged with sufficient travel so that, when said means for removing the meat piece are shifted, the meat piece is transferred from inside the tightly sealable chamber directly into one of said packings.

2. The improvements as claimed in claim 1, wherein said means for removing the meat piece is arranged so as to support the meat piece during sterilization inside said tightly sealable chamber.

3. The improvements claimed in claim 1, further comprising means for sequentially positioning the packings in front of said means for removing the meat piece, and interposing said packings in a direction of travel defined by movement of the meat piece.

4. The improvements as claimed in claim 1, wherein said travel of said means for removing the meat piece from the first station is rectilinear and substantially parallel to a horizontal plane of said second station and wherein said means for removing the meat piece is arranged so that said travel occurs at a level situated slightly above said plane of the second station.

5. The improvements as claimed in claim 1, wherein:

a lateral edge of said tightly sealable chamber is inclined and the means for removing a meat piece comprise a fork-shaped support with multiple parallel arms between which strips of said grid deck are capable of passing, said strips being arranged so as to leave the meat piece on said fork-shaped support during sterilization; and said fork-shaped support is attached to an end of a rod of a fluid-operated cylinder operable to shift said fork-shaped support when a cover is lifted away from said tightly sealable chamber and said meat piece is lifted towards an outside of the tightly sealable chamber, said support and rod thereby passing above a corresponding portion of said lateral edge of the tightly sealable chamber which is situated at a lowest level.

6. The improvements as claimed in claim 1, and further comprising:

nozzles for supplying jets of filtered, pressurized hot air which act on the outer surface of the meat piece after sterilization and opening of a cover of said tightly sealable chamber and during transfer of the meat piece into the packing.

7. The improvements as claimed in claim 5, wherein said feeder adopts a configuration of a grid of longitudinal strips and is associated with a fluid-operated cylinder having a rod which extends parallel to said fluid-operated cylinder attached to said fork-shaped support and at a higher level with respect thereto.

8. The improvements as claimed in claim 1, wherein said magazine contains bag-type packings for final packing of the meat pieces after sterilization, said bag-type packings being associated with one another by virtue of removable tapes connecting lateral parts of the bag-type packings, said bag-type packings being partially superimposed in such a way that a leading portion of each bag-type packing projects beyond a next one of the bag-type packings; and comprising:

- means for transferring the bag-type packings from said magazine, including suction pads associated with a fluid-operated cylinder and operable to engage a top sheet of a first One of said bag-type packings while said first one of said bag-type packings is still connected to other ones of said bag-type packings in the magazine and also operable to lift said top sheet;
- a tilting lever in the shape of an inverted "L" which includes a curved member at an end thereof and which can tilt after actuation of said suction pads to position the tilting lever inside the opening of the bag-type packing and underneath said top sheet, said end of the tilting lever having an opening and being operable to engage an inner face of said top sheet when the top sheet descends upon the curved member via actuation of the fluid-operated cylinder;
- a tube ending in said opening in the end of the tilting lever for applying a vacuum which facilitates gripping of said top sheet from an inside surface thereof;
- a gripper jaw attached to said tilting lever and capable of engaging an edge of a bottom sheet of said bag-type packings to thereupon grip said bag-type packings when a lower jaw is closed upon said gripper jaw in response to actuation of a fluid-operated cylinder for tightly gripping said edge of the bottom sheet; and
- a block which supports the means for transferring the bag-type packings, the tilting lever, the tube, and the gripper jaw.

9. The improvements as claimed in claim 8, wherein said block is associated with a fluid-operated cylinder of longitudinal travel and operable to shift said block along said second station thus pulling said first one of said bag-type packings and separating said first one of said bag-type packings from said other ones of said bag-type packings until said first one of said bag-type packings is arranged in a partially open condition in a packing area of said second station and is penetrated by four rods situated in pairs at each of two sides of said block, said four rods extending parallel to said direction of travel and being linked to a spreading mechanism; and

- a bottom of said second station has an opening to allow tilting passage of the tilting lever in order to grab the first one of said bag-type packings, and a longitudinal opening to facilitate longitudinal travel of the first one of the bag-type packings up to said packing area.

10. The improvements as claimed in claim 9, wherein said four rods are bent at ends thereof which are distally arranged with respect to the bag-type packings, and wherein said four rods are associated with first ends of first kind levers linked on lateral supports mounted in a sliding arrangement on transversal guides so that said lateral supports are capable of approaching one another and are also capable of being moved apart from one another in response to actuation of a fluid-operated cylinder of vertical travel, said fluid-operated cylinder of vertical travel having a rod attached to a cross member, said cross member being hingedly connected to two diverging arms which are link-coupled with said lateral supports, said first kind levers having opposite ends linked in a sliding arrangement along guiding slots of vertical plates, said guiding slots having lengths which are conveniently inclined so that shifting of the lateral supports determines, when pivoting the first kind levers, the mutual spreading of said four rods and thereby determine a full opening extent of the bag-type packings which receive free ends of said four rods.

11. The improvements as claimed in claim 10, wherein said lateral supports are associated with a rod of a fluid-operated cylinder having a travel which is coaligned with a direction in which the packings are shifted, so as to produce once one of the packings has been filled with the meat piece a shifting motion which takes place in a forward direction, combined with a retracting of the four rods in order to release the said one of the packings filled with the meat piece onto a roller deck of said second station.

12. The improvements as claimed in claim 10, wherein said vertical plates have photoelectric detectors at both of two sides of said vertical plates for detecting whether the four rods have been introduced into an opening of one of said packings.

13. The improvements as claimed in claim 1, further comprising:

- means in said second station for transporting the meat piece up to a vacuum sealing station, said means for transporting the meat piece up to a vacuum sealing station comprising a free-turning roller deck in said second station, and an assembly consisting of a suction pad which is resiliently loaded by a spring and is applied against a top face of a packing filled with the meat piece and a tilting pusher which is applied against a lateral face of said packing filled with said meat piece, said assembly being associated with a slide which travels transversely to a direction for positioning packings to be filled, slides on transversal guides and is actuated by a fluid-operated cylinder.

14. The improvements as claimed in claim 1, wherein said third station includes:

- a free-turning roller deck which is coplanar with the roller deck of said second station, tiltable, hinged at one lateral side and linked via an opposite lateral side to a fluid-operated cylinder of vertical travel; and
- a rotating actuator attached to a a twice bent lever which is operable to pick and remove from said third station bag waste left over after having been cut by a vacuum sealing unit.

* * * * *